(12) United States Patent
Li et al.

(10) Patent No.: US 9,604,253 B2
(45) Date of Patent: Mar. 28, 2017

(54) COATING SYSTEMS

(71) Applicants: Commonwealth Scientific and Industrial Research Organisation, Campbell (AU); The Boeing Company, Seattle, WA (US)

(72) Inventors: Sheng Li, Campbell (AU); Stuart Bateman, Campbell (AU); Alex Bilyk, Campbell (AU); Sarah Khor, Campbell (AU); Weidong Yang, Campbell (AU); Chris Broadbent, Seattle, WA (US); Glenn Dalby, Seattle, WA (US); Randall Jahren, Seattle, WA (US); Matthew D Jensen, Seattle, WA (US)

(73) Assignees: Commonwealth Scientific And Industrial Research Organisation, Campbell, ACT (AU); The Boeing Company, Seattle, WA (US)

( * ) Notice: Subject to any disclaimer, the term of this patent is extended or adjusted under 35 U.S.C. 154(b) by 68 days.

(21) Appl. No.: 14/365,608

(22) PCT Filed: Dec. 14, 2012

(86) PCT No.: PCT/AU2012/001526
§ 371 (c)(1),
(2) Date: Jun. 13, 2014

(87) PCT Pub. No.: WO2013/086571
PCT Pub. Date: Jun. 20, 2013

(65) Prior Publication Data
US 2014/0323378 A1    Oct. 30, 2014

Related U.S. Application Data

(60) Provisional application No. 61/576,509, filed on Dec. 16, 2011.

(51) Int. Cl.
| | | |
|---|---|---|
| *C09D 5/20* | (2006.01) | |
| *B05D 7/00* | (2006.01) | |
| *B05D 5/00* | (2006.01) | |
| *B05D 7/14* | (2006.01) | |
| *C09D 9/00* | (2006.01) | |
| *C09D 123/08* | (2006.01) | |
| *C11D 7/50* | (2006.01) | |
| *C08K 3/22* | (2006.01) | |
| *C08K 5/00* | (2006.01) | |

(52) U.S. Cl.
CPC ............... *B05D 7/54* (2013.01); *B05D 5/00* (2013.01); *B05D 7/14* (2013.01); *C09D 5/20* (2013.01); *C09D 9/00* (2013.01); *C09D 123/0869* (2013.01); *C11D 7/50* (2013.01); *C08K 3/22* (2013.01); *C08K 5/0091* (2013.01); *Y10T 428/265* (2015.01)

(58) Field of Classification Search
CPC .............. C09D 169/00; C09D 5/002

USPC ........................................... 427/301
See application file for complete search history.

(56) References Cited

U.S. PATENT DOCUMENTS

| | | | |
|---|---|---|---|
| 3,874,903 A | 4/1975 | Wirth | |
| 5,319,018 A | 6/1994 | Owens | |
| 8,936,836 B2 * | 1/2015 | Domes | B05D 7/14 427/385.5 |
| 9,080,061 B2 * | 7/2015 | Palmer | C09D 5/024 |
| 2003/0224195 A1 | 12/2003 | Tysak | |
| 2004/0191507 A1 | 9/2004 | Levitt | |
| 2004/0197572 A1 * | 10/2004 | Bell | C08J 7/047 428/424.8 |
| 2005/0166797 A1 * | 8/2005 | Li | C09G 1/16 106/203.1 |
| 2007/0249778 A1 * | 10/2007 | Clemens | C08G 18/10 524/502 |
| 2009/0130161 A1 * | 5/2009 | Sarangapani | A01N 59/16 424/409 |
| 2009/0155451 A1 * | 6/2009 | Ylitalo | A01N 25/10 427/8 |
| 2010/0062200 A1 * | 3/2010 | Domes | B05D 7/14 428/35.8 |
| 2011/0070376 A1 * | 3/2011 | Wales | A01N 63/00 427/414 |

(Continued)

FOREIGN PATENT DOCUMENTS

| | | |
|---|---|---|
| JP | 57-065361 A | 4/1982 |
| JP | 2002-285070 A | 10/2002 |

(Continued)

OTHER PUBLICATIONS

International Search Report for PCT/AU2012/001526 mailed on Feb. 11, 2013.
PCT International Written Opinion from PCT/AU2012/001526 dated Feb. 11, 2013.
PCT International Preliminary Report on Patentability Chapter II from PCT/AU2012/001526 dated Feb. 6, 2014.
Office Action from corresponding Australian Patent Application No. 2012350354 dated Oct. 19, 2015.

*Primary Examiner* — Gregory Webb
(74) *Attorney, Agent, or Firm* — Ladas & Parry, LLP

(57) ABSTRACT

The invention relates to a coating system, in particular a coating system containing an organometallic layer which allows the selective removal of post coating layers from substrates without detrimental impact to their "in-service" performance. The organometallic layer comprises (a) an organic polymer containing multi-chelating functionalities; and (b) a metallic agent which forms an organo metallic complex with the organic polymer containing multi-chelating functionalities and is located between an optionally coated substrate and at least one post coating layer of a coating system.

19 Claims, 6 Drawing Sheets

(56) References Cited

U.S. PATENT DOCUMENTS

| | | | | |
|---|---|---|---|---|
| 2011/0206936 A1* | 8/2011 | Maliverney | ............ | B01J 31/0251 428/447 |
| 2012/0082791 A1* | 4/2012 | Liversage | ............ | C09D 133/08 427/282 |
| 2013/0344310 A1* | 12/2013 | Wasserfallen | ......... | B05D 7/142 428/216 |
| 2014/0004266 A1* | 1/2014 | Wasserfallen | ......... | B05D 7/142 427/301 |

FOREIGN PATENT DOCUMENTS

| | | |
|---|---|---|
| WO | 02/20678 A1 | 3/2002 |
| WO | 2006/041559 A1 | 4/2006 |
| WO | 2011/023727 A1 | 3/2011 |

\* cited by examiner

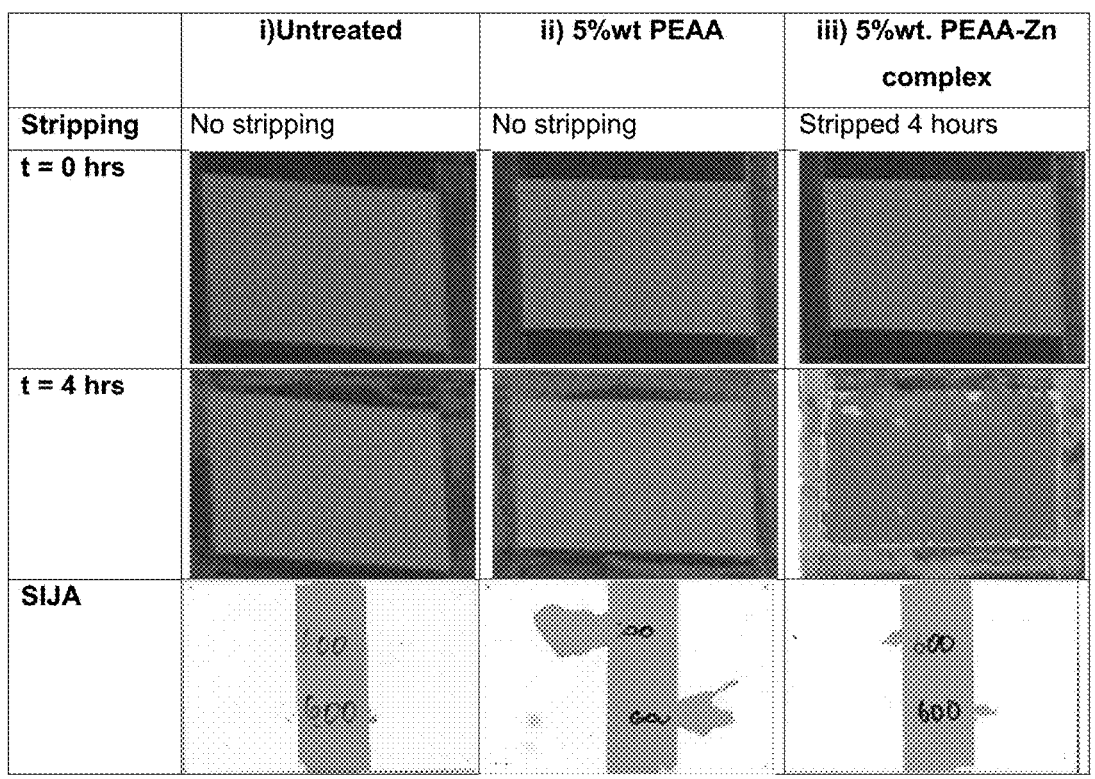

Figure 3: Effect of solvent and wetting agent
| Treatment | 3.5% PEAA-Zn (Zn-acid =1:3.2) | |
|---|---|---|
| | Stripping (hours) | Surface Film Formation |
| Standard untreated | -- | 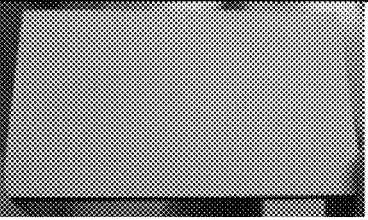 |
| No additional solvent added | 3.5 | 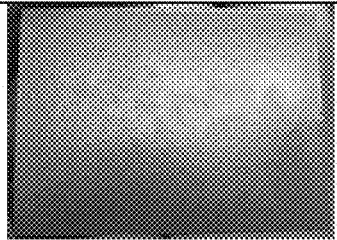 |
| 5% Proglyde DMM | 2 | 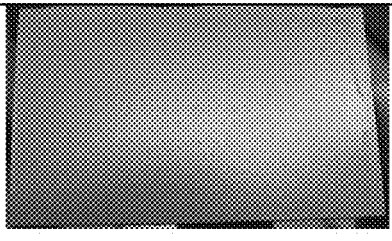 |
| 5% Dowanol DPnP | 2.5 | 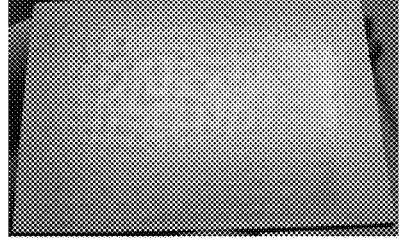 |
| 5% Dowanol PM | 1.5 | 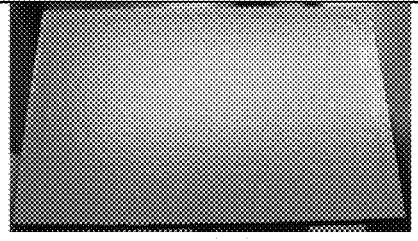 |
| 5% Dowanol PnP | 4 | 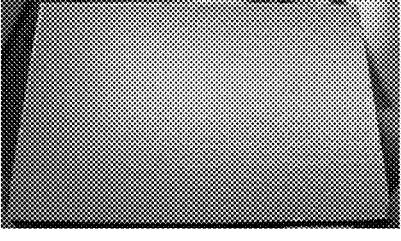 |

Figure 4: Surface treatment with the addition of carbodiimide as an organic cross-linker

| Treatment | Stripping (hrs) | SIJA Adhesion |
|---|---|---|
| 3.5%wt PEAA<br><br>1: 3.2 Zn:Acid<br><br>7.5%wt Carbodiimide | 7 | |

Figure 5: Multi-paint strip cycling

| | Standard Untreated Primer cured 2hr | 5%wt. PEAA-Zn Cycle 1 | 5%wt. PEAA-Zn Cycle 2 |
|---|---|---|---|
| Stripping (hours) | No | 4 | 8 |
| SIJA | | | |

Figure 6: Multi-layered topcoat (RTG and Desothane)

| | Standard Untreated- RTG on Primer cured 2hrs | 5%PEAA-1:4 Zn:Acid - RTG Topcoat Primer cured to 2hrs |
|---|---|---|
| Stripping (hours) | No | 4 |
| SIJA | | |

Figure 7: Overcoat window for treatment solution post-treatment
| Std untreated | - | 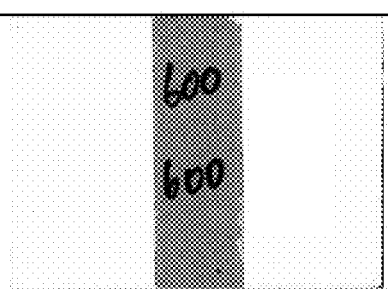 |
|---|---|---|
| Topcoat 2hrs after treatment | 2.5 | 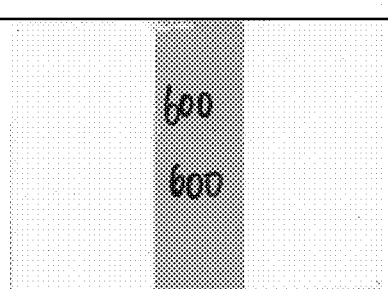 |
| Topcoat 24 hrs after treatment | 3 | 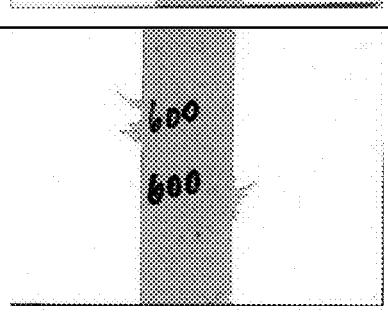 |

Figure 8: Overcoat window for treatment solution pre-treatment
| Std untreated | - | 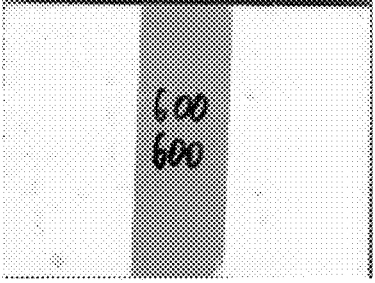 |
|---|---|---|
| Treatment 2hrs after priming | 3.5 | 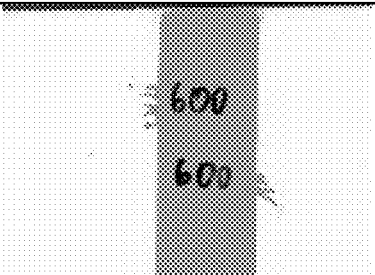 |
| Treatment 24 hrs after priiming | 4 | 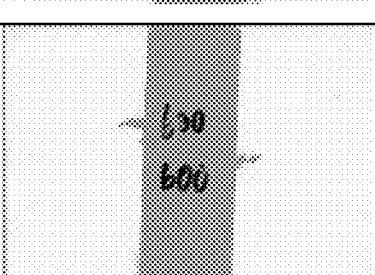 |

Figure 9 (a): Rain erosion test program 1

| | Std Untreated | 3.5%wt PEAA, 1: 3.2 Zinc:Acid 7.5% Proglyde wt. DMM 1:1 Isopropanol : Water |
|---|---|---|
| Rain Erosion Foils | | |
| Rating | 9 | 7 |

Figure 9 (b): Rain erosion test program 2

| | | 3.5%wt PEAA, 1: 3.2 Zinc:Acid, 3.5% wt PnP, 2.5% Proglyde DMM, 50% IPA | 3.5%wt PEAA, 1: 3.2 Zinc:Acid, 5% wt PnP, 50% IPA, aged |
|---|---|---|---|
| Rain Erosion Foils | | | |
| Rating | 7 | 7 | 7 |

Aged: 50C hot water immersion for 24 hours prior to the test

COATING SYSTEMS

CROSS-REFERENCE TO RELATED APPLICATIONS

This application is the U.S. National Stage of International Patent Application No. PCT/AU2012/001526 filed on Dec. 14, 2012, which claims priority to U.S. Provisional Patent Application No. 61/576,509 filed on Dec. 16, 2011, the disclosures of which are hereby incorporated by reference in their entireties.

FIELD

The invention relates to a coating system, in particular a coating system containing an organometallic layer which allows the selective removal of post coating layers from substrates without detrimental impact to their "in-service" performance. The organometallic layer is particularly suited to substrates which require periodic refreshing or removal and replacement of their coating systems such as aircraft and other transportation vehicles.

BACKGROUND

Stripping and recoating of aircraft is a routine practice in the aerospace industry. In this process, redundant layers of paint are stripped away either chemically and/or mechanically to minimize the weight build-up before a fresh layer is applied. The use of an intermediate coating (IC) layer based on solutions of synthetic resins in organic solvents, applied for example between the topcoat and primer is known for facilitating 'selective' stripping of the topcoat without affecting the integrity of the underlying primer or substrate. Such a strategy has benefits in terms of flow time reduction to complete the re-coating process and protection of the underlying materials from the stripper medium.

The use of barrier coatings composed of modified epoxy-polysiloxanes or film-forming polymers applied between the substrate and top coat have also been described. The barrier coating technique focuses on improving the chemical resistance of the primer and aims to reduce the capacity of the stripping solution to degrade the primer and importantly the substrate-primer interface.

Apart from enabling selective removal of the coating layer, the selectively strippable coating system must also conform to the application and in-service performance requirements necessitated by the application. In terms of aerospace coating systems, these include the required chemical resistance (for example, to hydraulic fluids and to aviation fuels and cleaners), environmental durability, mechanical properties, aesthetics (colour and gloss), and adhesion.

There may be deficiencies in using the intermediate and barrier coating techniques described above. These may include tight application window tolerances, reduced in-service performance, decreased selectivity or impact to the properties of the coating system following repeated stripping and recoating. Another draw back of these techniques is that the intermediate coating or barrier layer may have a thickness of up to 12 microns which can add extra weight. As such there is a pressing need to develop robust strategies which enable coating layers to be selectively removed that themselves, add minimal weight to the overall coating system, and, hence, in the case of aircraft, assist in reducing the operational environmental foot print.

SUMMARY

In a first aspect, there is provided an organometallic layer which comprises
(a) an organic polymer containing multi-chelating functionalities; and
(b) a metallic agent which forms an organo metallic complex with the organic polymer containing multi-chelating functionalities, the organometallic layer being located between an optionally coated substrate and at least one post coating layer of a coating system.

In a second aspect, there is provided a coating system which comprises:
(i) an optionally coated substrate;
(ii) at least one post coating layer; and
(iii) the organometallic layer defined above located between (i) and (ii).

In one embodiment, the organometallic layer further comprises an organic crosslinker.

In another embodiment, the multi-chelating functionalities are multi-carboxylate functionalities.

The organometallic layer when applied to the optionally coated substrate prior to the post coating layer enables the selective removal of the post coating layer from the substrate by stripping when the post coating layer needs to be replaced.

The organometallic layer also provides strong interfacial interaction and adhesion to the optionally coated substrate and the post coating layer to be selectively stripped and especially in aerospace coating systems where the organometallic layer provides chemical resistance for example to hydraulic fluids, aviation fuels and cleaners, environmental durability, mechanical properties, aesthetics (colour and gloss) and interfacial adhesion.

The organometallic layer may be applied on an optionally coated substrate to be further coated with the post coating layer and forms a thin layer of 5 microns or less between the substrate and the post coating layer allowing selective stripping of the post coating layer to occur at the organometallic layer while retaining the integrity of the optionally coated substrate. While not wishing to be bound by theory, it is believed that the stripping process occurs by disruption of the organometallic layer such that the post coating layer(s) are selectively removed while retaining the integrity of the optionally coated substrate. The substrate may be composed of metallic or polymer composite materials which are optionally coated for example with surfacing film, primer, undercoat, conversion, anticorrosion and/or topcoat layer(s). Coated substrates of this type are typically found in aerospace applications.

The post coating layer is the coating layer applied after the organometallic layer and includes top coats, overcoats or ready to go (RTG) coats.

In a third aspect, there is provided a process for coating an optionally coated substrate with at least one post coating layer which comprises
(i) applying a treatment formulation which comprises (a) an organic polymer containing multi-chelating functionalities; (b) a metallic agent which forms an organo metallic complex with the organic polymer containing multi-chelating functionalities; and (c) a solvent to form an organometallic layer defined above to the optionally coated substrate; and
(ii) applying at least one post coating layer to the organometallic layer of step (i).

In a fourth aspect, there is provided a treatment formulation to be applied to an optionally coated substrate for selectively stripping a post-coating layer applied on the treatment formulation which comprises:
(a) an organic polymer containing multi-chelating functionalities;
(b) a metallic agent which forms an organo metallic complex with the organic polymer containing multi-chelating functionalities; and
(c) a solvent.

In one embodiment, the treatment formulation further comprises an additive, in particular a wetting agent.

In a fifth aspect, there is provided a process for selectively removing the at least one post coating layer from the coating system defined above which comprises
(i) treating the at least one post coating layer with a stripping agent capable of disrupting the organometallic layer; and
(ii) removing the at least one post coating layer from the coating system.

In a sixth aspect, there is provided a process for coating an optionally coated substrate with at least one post coating layer which comprises
(i) treating the at least one post coating layer of the coating system defined above with a stripping agent capable of disrupting the organometallic layer to remove
at least one coating layer from the coating system;
(ii) forming a further organometallic layer defined above; and
(iii) applying at least one further post coating layer to the organometallic layer.

In a seventh aspect, there is provided a process for coating an optionally coated substrate with at least one post coating layer which comprises
(i) treating the at least one post coating layer of the coating system defined above with a stripping agent capable of disrupting the organometallic layer to remove
at least one post coating layer from the coating system;
(ii) applying at least one further post coating layer;
(iii) treating the at least one further post coating layer with a stripping agent capable of disrupting the organometallic layer;
(iv) removing the at least one further post coating layer;
(v) optionally repeating steps (iii) to (v);
(vi) forming a further organometallic layer defined above; and
(vii) applying at least one even further post coating layer to the further organometallic layer.

The post coating layer to be stripped can be multi-layered. For example, the coating may be a topcoat which is a decorative coating where layers of coatings of various colour is applied one after other to create logo, name, character, symbol and other features.

BRIEF DESCRIPTION OF THE DRAWINGS

FIG. 1 shows paint stripping and SIJA adhesion test results.
FIG. 2 shows paint stripping and SIJA results showing stripping for varying poly-acids.
FIG. 3 shows the effect of solvent and wetting agent.
FIG. 4 shows surface treatment with the addition of carbodiimide as an organic crosslinker.
FIG. 5 shows multi-paint strip cycling results.
FIG. 6 shows results for multi-layered topcoat (RTG and Desothane).
FIG. 7 shows the overcoat window for treatment solution post-treatment.
FIG. 8 shows the overcoat window for treatment solution pre-treatment.
FIGS. 9(a) and 9(b) show the results for rain erosion test programs 1 and 2.

DETAILED DESCRIPTION

The invention relates to an organometallic layer which when present on an optionally coated substrate prior to at least one post coating layer enables the selective removal of the post coating layer from the substrate by stripping when the post coating layer needs to be replaced by another post coating layer.

Organometallic Layer

The organometallic layer includes (a) an organic polymer containing multi-chelating functionalities, preferably multi-carboxylate functionalities and (b) a metallic agent which forms an organo metallic complex with the organic polymer containing multi-chelating functionalities. The layer may further contain (c) an organic crosslinker. The organometallic layer is formed by application of a treatment formulation comprising the polymer and metallic agent defined above and a solvent. The treatment solution may optionally contain an additive and/or an organic crosslinker.

While the solid content of the treatment formulation is limited only by the solubility and viscosity, it preferably has a low solid concentration in the range of 0.1% to 50% based on the total weight of the formulation, more preferably in the range of 0.5 to 25%, most preferably in the range of 1% to 10% to facilitate application of the organometallic layer on the substrate and avoid thick film built up. The dry thickness of the organometallic layer depends on the application and may be in the range of 5 microns or less, preferably 2 microns or less. The organometallic layer preferably has a thickness of less than 2 micron so that it does not add significant weight to the coating system.

The molar ratio (Z:A) of metallic agent (Z) to the chelating functionality (A) of the organic polymer containing multi-chelating functionalities may be in the range of 1:1 (Z:A) to 1:10(Z:A), preferably in the range of 1:2(Z:A) to 1:5(Z:A), more preferably in the range of 1:2.5(Z:A) to 1:4(Z:A).

The components of the organometallic layer may be dissolved or otherwise dispersed in appropriate solvent to obtain a treatment formulation and the treatment formulation is applied on the substrate to form the organometallic layer by any method known in the coating industry including spray, drip, dip, roller, brush or curtain coating, especially spray.

The location of the organometallic layer is not limited, for example the treatment formulation could be applied directly onto the substrate or onto any of the primer, undercoat, conversion, anti-corrosion or topcoat layers in the coating built up prior to post coating. In aerospace applications, the treatment formulation could advantageously be applied to the primer prior to the application of the post coating layers such as decorative or functional topcoat layers or otherwise applied on the surfacing film prior to the application of the post coating layers such as decorative or functional topcoat layers.

The organometallic layer can provide the dual advantages of promoting adhesion between the coating layers as well as a strippable mechanism when one or more post coating layers are required to be stripped from the optionally coated substrate. The organometallic layer also provides chemical resistance for example to hydraulic fluids, aviation fuels and cleaners and meets the requirement of environmental durability, mechanical properties, aesthetics (colour and gloss) in aerospace coating systems.

Organic Polymer Containing Multi Chelating Functionalities

The organic polymers containing multi-chelating functionalities are organic polymers containing at least two chelating groups preferably carboxylate groups, more preferably acidic groups or groups that can form acidic groups in situ including but not limited to carboxylic, anhydride precursors, or phosphonic acid groups and preferably polymers and oligomers containing at least two acidic groups including but not limited to carboxylic, anhydride precursors, or phosphonic acid groups. The functionalities may be provided on a homopolymer or a copolymer. The polymers and oligomers can be selected from homo or copolymers having molecular weights ranging from 200 to 1,000,000, preferably 5,000 to 50,000. It will be appreciated that the molecular weight of the organic polymer is selected to allow the organometallic layer to maintain solubility for ease of application.

Suitable polymers or oligomers containing multi acidic groups include copolymers or oligomers of ethylene or styrene with acrylic, (meth)acrylic or maleic anhydride and preferably copolymers of styrene-co-maleic anhydride (PSMA) or ethylene-co-acrylic acid (PEAA) such as commercially found under trade mark Primacor (Dow), Nucrel (Dupont), Lucalen (BASF).

Metallic Agent

The metallic agent may be a metal compound such as metal oxide, metal hydroxide or an organo-metallic compound such as a metal acetate which is capable of forming an organo-metallic complex with for example the multi-acid containing polymer or oligomer. Suitable metals in the metallic agent include transition metals such as silver, copper, nickel, strontium, thallium, tin, titanium, vanadium, zinc, tungsten and zirconium, preferably zinc, vanadium, silver, nickel, tungsten and copper, more preferably zinc, copper and tungsten.

The metallic agent is preferably in the form of a metal oxide, hydroxide or salt. The metal oxide and metal hydroxide may be dissolved in an ammonia solution to form metal ammonia hydroxide complex in solution. Suitable metal oxides include oxides of transition metals such as silver, copper, nickel, strontium, thallium, tin, titanium, vanadium, zinc, tungsten and zirconium, preferably zinc, vanadium, silver, nickel, tungsten and copper, more preferably zinc and vanadium. Suitable metal hydroxides include hydroxides of transition metals such as silver, copper, nickel, strontium, thallium, tin, titanium, vanadium, zinc, tungsten and zirconium, preferably zinc, vanadium, silver, nickel, tungsten and copper, more preferably zinc, copper and tungsten.

The metal salt may be a metal acetate, chloride, nitrate or sulfate. The metal salt is reacted with a base forming metal hydroxide. The metal hydroxide is then dissolved in an ammonia solution to form a metal ammonia hydroxide complex in solution. Suitable metal salts include salts of transition metals such as silver, copper, nickel, strontium, thallium, tin, titanium, vanadium, zinc, tungsten and zirconium, preferably zinc, vanadium, silver, nickel, tungsten and copper, more preferably zinc, copper and tungsten.

Organic Crosslinker

The organometallic layer may also include an organic crosslinker. The organic crosslinker may be incorporated into the treatment solution prior to application on an optionally coated substrate. The organic crosslinker is an organic compound containing at least two functional groups capable of at least partially reacting with one or more of the multi-chelating functionalities of the organic polymer. While not wishing to be bound by theory, it is believed that the reaction of the organic crosslinker with the multi-chelating functionalities reinforces the mechanical properties of the organometallic layer to improve adhesion. In the case of organic polymers containing a multi-acid functionalities, the organic crosslinker may contain at least two functional groups which may be the same or different and selected from epoxy, aziridine, isocyanate, amine, imine and anhydride groups. Preferably the crosslinker is carbodiimide.

Treatment Formulation

The organometallic layer is formed from a treatment formulation comprising the organic polymer, the metallic agent and a solvent. The treatment formulation is prepared by dissolving or dispersing both the organic polymer and the metallic agent together in appropriate solvent or dissolving or dispersing each separately then mixing both together. The treatment formulation may be applied in different physical forms such as a solution, suspension, mixture, aerosol, emulsion, paste or combination thereof, solutions or emulsions are preferred.

The solvent may be a single solvent or a mixture of solvents. Additives can also be added to facilitate the dissolution of the organic polymer and metallic agent, the wetting of the substrate and film forming for the organometallic layer on the substrate.

When the treatment formulation contains an organic polymer containing multi-acid functionalities and the metallic agent is a metal oxide, metal hydroxide or metal acetate, the components may be dissolved in alkaline solution of water, an organic solvent or a mixture of water and an organic solvent together or separately and the basicity of the solution may be adjusted by, for example, the addition of ammonia or a volatile amine based compound.

Suitable solvents include water and polar organic solvents or mixtures thereof. Organic solvents can be selected from but not limited to solvents containing groups selected from ketones such as methylpropylketone; alcohols such an ethanol, isopropanol, benzyl alcohol and tetrahydrofurfuryl alcohol; ethers such as glycol ethers, for example di(propylene glycol)dimethyl ether; and/or esters. Other additives providing properties such as wetting, film forming, film levelling and drying can also be added to the treatment formulation. Small amounts of solvent capable of swelling the optionally coated substrate may be desirable in some applications to enhance adhesion with the organometallic layer. Such an example is found in aircraft applications where a primer is pre-coated on a substrate and solvents selected from those containing ketone (e.g. methylpropylketone), ether (e.g. dipropylene glycol dimethyl ether such as PROGLYDE™) or alcohol (e.g. benzyl alcohol and tetrahydrofurfuryl alcohol) can be added to the components of the organometallic layer. Organic solvents such as ethylene glycol ethers or propylene glycol ether can be added to assist in reducing the surface tension and improving the wetting and film forming. Examples include Dow Glycol ether and Dowanol™.

Other additives known to those skilled in the coating industry can optionally be added to the treatment formulation forming the organometallic layer. Examples of such additives include:
(a) rheology;
(b) film formers;

(c) wetting agents such as ethers including glycol ethers (e.g. propylene glycol methyl ether (Dowanol PM) or propylene glycol propyl ether (Dowanol DPnP);
(d) surfactants;
(e) dispersants;
(f) anti foaming agents;
(g) anti corrosion reagents;
(h) stabilizers;
(i) leveling agents;
(j) pigments; and
(k) organic and inorganic dyes.

The treatment formulation may also contain the organic crosslinker defined above.

Optionally Coated Substrate

Suitable substrates include metals (e.g. aluminium), polymers (e.g. polyimide), composites (e.g. carbon fiber reinforced epoxy) and other types of solid substrates such as elastomers (e.g. polysulfide sealants). The substrate may be coated. The treatment formulation is preferably applied to metallic and/or polymer composite substrates and particularly on substrates where anti-corrosion, surfacing film, under coat, primer and/or top coat layers are applied, especially for aircraft applications where metallic or composite substrates are coated with a primer layer or surfacing film. For a polymer based substrates, surface activation by physical, physiochemical or chemical oxidation or by application of the primer can occur prior to application of the treatment formulation.

Post Coating Layer

The one or more post coating layer(s) to be applied on the organometallic layer include, but are not limited to, fully or partially cross-linked organic coatings. Examples of organic coatings include, polyurethane, epoxy, polyester, polycarbonate and/or acrylic coatings, more preferably polyurethane and epoxy coatings. Due to their superior mechanical properties and resistance to abrasion, chemical attack and environmental degradation, such organic coatings are widely used to protect infrastructure in the aerospace, marine, military, automotive and construction industries. The coating may be a solvent based coating or a powder coating and be applied by any means known to those in the art including spray, drip, roller or brush. Electrostatic painting may be applied in the solvent base system and electrostatic powder coating is applicable with solventless powder coating systems.

Post Coating Layer Removal

Selective stripping of redundant post coating layers can be achieved using any suitable known stripping technique such as application of a paint stripper formulated with an organic solvent or a mixture of organic solvents with water. While wishing not to be bound by theory, it is anticipated that stripping of the post coating layers occur by disruption of coordinate bonds between the organic polymer and the metal present in the organometallic layer. Suitable paint strippers include commercially available strippers based on aqueous benzyl alcohol with activating additives having alkaline, acid or peroxide group(s). In one embodiment, the paint stripper is an alkaline stripper such as benzyl alcohol based strippers for example, CEE BEE PAINT STRIPPER E-2002A, CEE BEE E-2787 or CEE BEE E-2012 from McGean-Rohco Inc. Addition of a base chelating agent to the alkaline paint stripper is also desirable to accelerate the stripping speed.

Mechanical means can be applied to facilitate the post coat stripping at the final stage of the stripping process including high pressure water jet and touch up sanding. High pressure water jet is commonly applied in aerospace industries at the final stage when the post coating layer is disrupted and loosely attached on the surface to remove off the post coating layer.

Once the redundant post coating layers are selectively removed, the organometallic layer can be re-formed prior to re-application of a new post coating layer for future selective removal. Generally a post surface cleaning with water base cleaner or solvent wiping is applied to the freshly stripped substrate and in aerospace industries a base water cleaner is usually used to clean the surface prior application of the organometallic layer.

Applications

The organometallic layer or coating system may be formed on small or large areas, to sections of larger parts, components or full infrastructure such as infrastructure associated with the aerospace (e.g. aircraft), automotive (e.g. vehicles), marine (e.g. ships), transportation (e.g. trains), military (e.g. helicopter, missile) or construction industries (e.g. buildings, factories, floors). The surface may have simple or complex geometry or may be at any incliniation.

EXAMPLES

The invention will now be described with reference to the following non-limiting examples. Although the examples concentrate on coatings derived from polyurethane and epoxy chemistries it will be understood that the same activation methodology could be applied to coatings such as but not limited to those based on epoxy, acrylic, polycarbonate or polyester coatings through the appropriate choice of solvent(s), agent(s) and optional additives under appropriate activation conditions.

Abbreviations

CA7501 Desoprime® CA7501
CA8000 Desothane® CA8000
CA8000A Desothane® CA8000A
DFT Dry Film Thickness
IPA Isopropanol
MPK Methyl propyl ketone
$M_n$ Number average molecular weight
NCO Isocyanate
NMR Nuclear Magnetic Resonance
PA Polyamide
PE Polyethylene
PEAA Polyethylene-co-acrylic acid
PEAA-Cu Polyethylene-co-acrylic acid with copper complex cross-linking
PEAA-W Polyethylene-co-acrylic acid with tungsten complex cross-linking
PEAA-Zn Polyethylene-co-acrylic acid with zinc complex cross-linking
PU Polyurethane
PROGLYDE®DMM Di(propylene glycol) dimethyl ether
Dowanol PM Propylene glycol methyl ether
Dowanol PnP Propylene glycol propyl ether
Dowanol DPnP Di(propylene glycol) propyl ether
SIJA Single Impact Jet Apparatus
SM905 Surface Master 905
Zn:A Zinc to acid ratio
Experimental Section
Materials and Methodology
Composite and Pre-Treatment The examples were completed on epoxy-carbon fibre composite panels supplied by Boeing. These composite coupons were pre cleaned with alkali cleaning agents and air dried before wiping with MPK and drying at the room temperature prior to primer and coatings applications.

Primer, Coatings and Painting Conditions

Primer (DESOPRIME CA 7501 Non-Chromated HS FR Primer Gray), intermediate coat (F565-4010), RTG-topcoats and top coat (DESOTHANE HS CA8000/B70846X) were all purchased from PPG and prepared and applied as per specifications.

Spray painting of the composite coupons occurred in two stages or three stages depending if RTG coating is applied. In the two stage case, the first involved the application of PRC DeSoto CA7501 primer within 24 hours of panel preparation at a target of 0.5 mil (12.5 micron) dry film thickness (DFT) and cured under ambient conditions (typically 70 F 40% RH). The second, a continuous film of PRC DeSoto CA8000 topcoat (C thinner) at a target 2.8 mil (70 micron) DFT was then applied within 24 hours of samples being primed and within 3 hours post surface treatment, on applicable samples (unless otherwise specified). In the three stage case, RTG-topcoat was applied on the substrate at the 25 micro meters and cured 49° C. for 4 hours before the final top coat Desothane CA8000 was applied.

Formation of the organometallic layer occurred after application of the treatment formulation after primer was sprayed and partially cured between 2 to 24 hours.

A Yamaha robotic painting arm incorporating a gravity-fed Binks Mach 1A automatic spray gun, configured with a 94 nozzle was employed in spray painting of flat panels. Spray painting was conducted with an inlet pressure of 40 psi, a scan rate of 100 mm/s and a specimen to gun nozzle distance of 180 mm. The coating thickness was controlled by the gun's fluid needle control position adjusted in line with paint thickness measurements assessed using a Fischer Isoscope (MPOD) on aluminium substrates.

Samples prepared for SIJA analysis were taped through the centre of the coupon with ½" 3M vinyl tape (#471) before topcoat application to generate a leading paint edge upon its removal.

RTG Topcoat

Samples prepared for robustness testing incorporated RTG-topcoats mixed at a base:activator ratio of 4:3 by volume with a target 25 micron applied in between the surface treatments and Desothane CA8000. These were cured at 49° C. for 4 hours and overnight at ambient to ensure sufficient cross-linking prior to CA8000 application.

Surface Modification

Application of the treatment formulation was conducted using a Binks Mach 1A automatic spray gun, configured with a 97P nozzle. A 30 psi inlet pressure was utilized during application. A relative spraying velocity of 2.5 m/min and flow rates of 25 ml/min was used. Samples were allowed to dry for 3 hours then used directly for painting.

For multi stripping and recoating experiments, samples were stripped completely of CA8000 topcoat with CEE-BEE 2012A and washed thoroughly with water followed by isopropanol and left to dry overnight. Prior to reapplying the treatment formulation, samples were wiped with MPK solvent.

Preparation of the Treatment Formulation—Polymer Containing Multi-Chelating Functionalities with Metallic Complex Agent Poly (Ethylene-Co-Acrylic Acid) (PEAA) Stock Solution PEAA were obtained as solid resin from Dow (Primacor 5990I and Primacor 5980I) or Dupont (Nucrel 960, 15% methacrylic acid, Nucrel 2806 18% acrylic acid) and 20% stock solution was prepared from which or as dispersion from Michem (Michem 4983R). PEAA resin was dissolved in ammonia water solution typically to a 500 ml round bottom flask and to it was added 40 g PEAA (Primacor 5990I, 20% acrylic acid content), 8 g of 25% ammonia solution and 152 g of water. The resulting suspension (Stock A), consisting of 20% wt. PEAA, was stirred at reflux until all PEAA is fully dissolved.

2, 3.5 and 5% wt solutions of ethylene-co-acrylic acid emulsion were made using Stock A in a 1:1 water to isopropanol measured by weight.

Zinc Ammonia Hydroxide Complex Solution (Stock Solution B)

Zinc oxide (99.5%) and zinc acetate dehydrate (98%) were purchased from Chem-Supply. Stock B solution of Zinc ammonia hydroxide complex solution were prepared by dissolving directly ZnO in ammonia solution (typically 9 g ZnO was dissolved in 991 grams 10% ammonia solution at the room temperature to obtained 0.9% ZnO/ammonia solution) or by precipitation of zinc salt in ammonia solution then redissolved in ammonia solution after the precipitate was water washed. Typically 100 g zinc acetate dihydrate was dissolved in 500 g water and 62 g 25% ammonia solution was slowly added in. The white precipitated was filtered and washed three time with distilled water then dissolved in 500 g 10% ammonia solution. A Stock solution B of zinc ammonia hydroxide complex solution were obtained after filtering insoluble solid with normalised concentration based on ZnO about 4-5% (measured by drying method and ZnO was the dried product).

Zinc Modified PEAA with Varying Zinc to Acid Ratio

Calculated amount water was added to the Stock solution A then Stock B was added to diluted Stock A to give different zinc to acid ratio at 2, 4, 5.6, 6, 7, 8 and 10% wt ZnO to PEAA. Isopropanol was added in to obtained 2.5, 3.5 or a 5% wt PEAA concentration in a final solvent ratio of 1:1 water and isopropanol prior to surface treating.

Zinc Modified PEAA Varying Solvent Type

Calculated amount of water was added in to Stock solution A then Stock B was added to diluted Stock A to obtain a 7% wt ZnO to PEAA. Isopropanol and other solvent were added sequently to the resulting mixture to give a 3.5% wt PEAA solution made up in a 42.5:50:7.5 weight of water: isopropanol: Proglyde DMM. Similar modifications were made using Dowanol DPnP, Dowanol PM and Dowanol PnP.

Zinc Modified PEAA with Additional Organic Crosslinker

Carbodilite V-02-L2, 40% aqueous solution available from Nippon Industries Inc. was used as the modifier.

Calculated amount of water was added in to Stock solution A then Stock B was added to diluted Stock A to obtain a 7% wt ZnO to PEAA. Isopropanol and carbodiimide were added sequently to the resulting mixture to give a 3.5% wt PEAA solution made up in a 42.5:50:7.5 weight of water: isopropanol: carbodiimide.

Other Metal Complex Modified PEAA Solution

Alternative metal complexing agents:ammonium cuperate (Cu), ammonium metatungstate (W) and ammonium vanadate (V) were made up as a 10% wt solution dissolved in water, labelled stocks C to E.

Solutions were made up using Stocks C to E to contain 7% wt Cu, W or V to PEAA at a final concentration of 3.5% wt PEAA, diluted with water and isopropanol at a 1:1 wt. ratio.

Characterisation and Testing

NMR Methods

Samples of product were withdrawn with a syringe for H-nmr acquisition.

[1]H-nmr spectra was observed at room temperature using a Bruker Av 400 (400 MHz) spectrometer or a Varian Utility Plus (300 MHz) spectrometer, in deuterated chloroform.

XPS Analysis

XPS analysis was conducted using a Kratos Axis HS spectrometer equipped with a monochromatic Al Kα x-ray source. The surface charge was compensated by the in-built charge neutraliser. The surface area analysed was approximately 1 mm$^2$ and the take-off angle for all analysed samples was 90°. The power applied for the analysis was 120 watts. The hydrocarbon peak at 285 eV served as an internal reference. Chemical compositions expressed as atomic percentage were calculated from the survey spectra collected over 20 minutes at 0.5 eV steps. Specimens were mounted on the sample holder and then flushed with high pressure nitrogen to remove any dust deposited on the surface.

Coatings Thickness:

DFT used to check the thickness of coatings using a Fischer Isoscope on an aluminium test panels and it was done batch by batch. Painted panels were allowed a 1 hour flash off period before oven curing at 120° F. (49° C.) for a total of 72 hours.

Paint Stripping

Stripping tests were completed using CeeBee-E2012A (CEE-BEE). The stripper was applied to coupons, edges taped with aluminized tape (3M Scotch 425), by paint brush and observations were made every 30 minutes. The stripper was removed by a plastic scraper and reapplied every 2 hours.

At 8 and 16 hrs, samples were scrapped and covered with aluminium foil to prevent drying and the test recommenced the following day where necessary. The coupons which sat vertically up were exposed to the strippers for a total of 24 hours.

Paint Adhesion Test

SIJA Adhesion Test

Adhesion testing was completed using a Single Impact Jet Apparatus (SIJA, Cambridge) roughly according to BSS 7391. The initial equipment was configured using a 1 mm nozzle and employed 0.22 calibre 5.5 mm Crosman Accupell Pointed Pellets (#11246). The nozzle-specimen distance was fixed at 7 mm. Testing was completed following immersion in water overnight, employing a line laser to locate the impact position and using a 45° specimen to impact droplet geometry. A single water jet was impacted at each site to test adhesion with the pressure employed for the "shot" indicated below its impact. A 600 m/s target velocity was used for each individual shot.

Rain Erosion Test

Rain erosion testing was conducted in accordance to BOEING Specification Support Standard BSS7393.

The leading edge of the composite foil for exposure to rain droplets was generated by taping 1.82±0.03 inches with PG-777 tape (3M Co.) from the lower edge of the foil after surface treatment and prior to the topcoat being applied.

Post curing, the foils were soaked in water for 16-24 hours then loaded into a whirling arm chamber and spun at average velocity of 385 miles per hour exposed to simulated rain of 3-4 inches of rainfall per hour and 1-4 mm in droplet size for about 30 mins. Specimens were then removed and analysed.

Skydrol Hydraulic Fluid. Pace B-82 Cleaning Agent and Water Immersion

Treated and painted samples (150 mm×75 mm) were soaked at room temperature in either de-ionised water or Skydrol (Aviall) hydraulic fluid for 30 days before pencil hardness and scribe adhesion testing.

Treated and painted samples (150 mm×75 mm) were soaked in Pace B-82 (Nalco-Ondeo) base cleaner and observed for paint lifting after 24 hours and 21 days.

Pencil Hardness

Pencil hardness measurements were made in accordance to AS/NZS 1580.405.1.

KOH-I-NOOR graphite leads dressed by rubbing the end flat with abrasive paper, were pushed against the sample substrate at 45° and observed for any paint removal in increasing hardness from 6B to 8H. The samples were rated against the softest pencil grade that led to consistent paint removal off the surface.

Scribe Adhesion

Scribe adhesion was conducted in general accordance to BOEING specification support standard BSS7225.

Test specimens were scribed with a sharp blade to cut through the coating and into the base substrate to give 5 parallel scribes and repeated at a 45° angle to produce a crosshatch. The parallel scribes were 0.12" apart.

Tape 250 (3M Co.) type masking tape was used, applied to the 45° intersection of the cross-hatch scribes and pressed down firmly using the tape roll.

The tape was then removed in one quick but smooth motion, perpendicular to the panel and examined for coating removal from the substrate and rated as outlined in the specification standard.

The invention will now be described with reference to the following non-limiting examples.

Example 1

In this example, composite plaques were prepared as discussed in the sample preparation section, primed and topcoat following treatment 2 hours after priming:
i) No treatment
ii) Treated with 5% Wt PEAA aqueous solution
iii) Treated with 5% PEAA-Zn complex aqueous solution with the acid to Zn ratio being at 3.2

Specimens were dried at the room temperature for 3 hours and sprayed with the topcoat then cured at the 49° C. for 72 hours before SIJA and stripping tests were carried out. Results from stripping test and SIJA adhesion test obtained were presented in FIG. 1.

It can be noted that no stripping occurred for i) no treatment (as expected from commercial information) and ii) treated with 5% wt PEAA aqueous solution, even at the extended stripping time for 24 hours. Paint stripping in sheet morphology occurred with specimen treated with 5% wt PEAA-Zn complex and full stripping was completed at the 8 hour mark. This example demonstrated that a metal agent must be present in the multi acid containing polymer and complex with the multi acid functionality to form a strippable structure using the alkaline stripper. It can also be noted that the treatment by iii) 5% PEAA-Zn did not comprised the paint adhesion as the paint peel-off by SIJA is comparable to the standard untreated benchmark specimen. In contrast, the 5% wt PEAA treatment results in a reduction of paint adhesion as larger area of paint is peeled off by SIJA testing. Illustrated here is that use of PEAA without metal complex alone has no advantage for stripping and only caused deterioration of paint adhesion.

Example 2

In the following example, carbon fibre epoxy composites were pre-cleaned and applied with primer as Example 1 and treated with following PEAA-Zn complex aqueous solution:

i) 3.5% PEAA(Primacor P5990I)-Zn complex aqueous solution;
ii) 3.5% PEAA(Primacor P5980I)-Zn complex aqueous solution;
iii) 3.5% PEAA(Nucrel 2806)-Zn complex aqueous solution;

The acid to Zn ratio was kept constant at 3.2 and 5% Proglyde DMM was added in to all three formulations to improve the wetting and film forming of the aqueous solution. Specimens were then dried and painted as per Example 1. Paint stripping and SIJA paint adhesion results are presented in FIG. 2. It can be noted from FIG. 2 that all treatment with various PEAA-Zn complex results in paint stripped and very good paint adhesion.

Example 3

In the following example, Zn was substituted by other metal agent such as Cu (cuperate) or W (meta-tungstate) in the 3.5% wt PEAA (Primacor P5990I) treatment formulation and a similar experiment was carried out as Example 2. Stripping results obtained were compared to PEAA-Zn formulation presented in Table 1. The stripping results again confirm selective stripping of paint is possible with when PEAA was complexed with a metal agent other than Zn.

TABLE 1

Variation to metal agent (based on 3.5% wt. Primacor P5990I)

| Treatment | 3.5% PEAA-Zn | 3.5% PEAA-Cu | 3.5% PEAA-W |
|---|---|---|---|
| Stripping (hours) | 2 | 1.5 | 4 |

Example 4—Effect of Zinc to Acid Ratio

In the following example, a similar experiment to Example 2 was carried out with 3.5% PEAA (Primacor 5990I)-Zn complex aqueous solutions for which the Zn-acid ratio in the formulation was varied from 11.2 to 2.8. Stripping results obtained were compared to the Zn to acid at 3.2 ratio and presented in Table 2. The results show that all treatments with the PEAA-Zn formulation resulted in paint stripping and demonstrated a wide operational window for a multi-acid containing polymer with metallic agent.

TABLE 2

Effect of Zn to acid ratio on selective stripping

| | Zn:Acid (Mol ratio) | | | | | |
|---|---|---|---|---|---|---|
| | 1:11.2 | 1:5.6 | 1:4 | 1:3.6 | 1:3.2 | 1:2.8 |
| Stripping (hours) | 2 | 2 | 2 | 1.5 | 1.5 | 1.5 |

Example 5—Effect of PEAA Concentration and Over Spray of Treatment Solution

In the following example, 2.5%, 3.5% and 5% by weight PEAA (Primacor P5990I)-Zn with acid Zn ratio at 3.2 were prepared and applied to the composite as Example 1. 5% PEAA-Zn treatment formulation was sprayed 5 times to evaluate the effect of overspray. Sample preparation, painting and stripping was as per Example 1 and stripping results obtained are presented in Tables 3 and 4. The topcoat stripped with the alkaline stripper for all conditions inves-tigated and excessive application of the treatment formulation only results in increase of stripping time but yet falling within the specification. This demonstrates again the robustness of the treatment process for industrial application.

TABLE 3

Effect of PEAA concentration

| Treatment | 2.5% wt PEAA | 3.5% wt PEAA | 5% wt PEAA |
|---|---|---|---|
| Stripping (hours) | 3.5 | 3.5 | 3.5 |

TABLE 4

Effect of overspray of treatment solution

| Treatment | 5% wt. PEAA-Zn, 1 pass | 5% wt. PEAA-Zn, 5 passes |
|---|---|---|
| Stripping (hours) | 3.5 | 14 |

Example 6—Effect of Additive

Surface finish is very critical for the successful application of decorative coating and hence the solvent and surface wetting agents are important components of the formulations, especially with a water-based formulation applied on low surface energy or low polarity surface. Various solvents were added at low percentage to the formulation and the experiment as per example 1 was carried out. The stripping results and the surface finish of the treatment were presented in FIG. 3. It was found that addition of solvent and wetting agent resulting improve the wetting of treatment formulation and film forming and but has little impact on top coat stripping, even in case of PROGLYDE® DMM which swells slightly the primer. As the application of treatment formulation is in general preferably applied at the sub micron level for cost effectiveness and reduction of weight consideration, effect of the treatment on appearance of top coat was not observed even with formulation without addition of wetting agent. Addition of solvent and wetting agent can be useful where in industrial application for control of drying time and obtaining wide operation window.

Example 7—Effect of Adding an Organic Cross-Linker

Improvement to the intercoat adhesion is achieved by use of an organic cross-linking agent to reinforce the polymer used in treatments. In the following example, and as shown in FIG. 4, a treatment solution employing 7.5% wt (based on PEAA weight) carbodiimide (CARBODILITE V-02-L2, Nisshinbo Chemical Inc.) in a 3.5% wt PEAA and utilising a Zn:Acid ratio of 1:3.2, prepared as described previously, demonstrates intercoat adhesion integrity and selective strippability.

Example 8—Multi-Paint Strip Cycling

Specimens treated with 5% PEAA-Zn (Primacor P5990I, Zn/A 3.2) and top coat stripped were cleaned by isopropanol and MEK and dried overnight. Specimens were then applied by the treatment formulation again. Painting and stripping were then repeated under same conditions as Example 1 and results obtained were presented in FIG. 5. Multi coating and stripping can be achieved as shown by the results following the surface treatment according to the invention. It also noted that good top coat adhesion is maintained as demonstrated by the SIJA adhesion test.

Example 9—Multi-Layered Topcoat (RTG and Desothane)

In the following example, stripping of multi layer topcoat following the surface treatment according to the invention is demonstrated. Composite specimens were prepared and primed as Example 1 and applied with PEAA-Zn formulation (5% PEAA-Zn (Primacor P5990I, Zn:Acid 1:4)) and painted with a Ready-to-Go (RTG) topcoat, cured at 49° C. for 5 hours then left at ambient overnight before being painted with the topcoat Desothane® CA8000. After curing, stripping of the topcoat was carried out under condition as Example 1. It was found that stripping at the surface treatment interface and both RTG and top coat Desothane® CA8000 were removed off the surface after application of alkaline stripper. Results in FIG. 6 also shown stripping time was not affected by the multi layer topcoat and again good SIJA adhesion was obtained. This demonstrates that the surface treatment is according to the invention is suitable for application where multi topcoat is required such as the ready to go system where RTG top coat was applied in factory and the final top coat is applied in the paint hanger.

Example 10—Demonstration of Treatment Over a Wide Operational Window

FIGS. 7 and 8 demonstrate the effectiveness of the treatment applied to a substrate over an application window of 24 hours without significant deterioration to the intercoat adhesion and strippability.

In FIG. 7, the composite coupons were treated with a 3.5% wt PEAA and a Zn:Acid=1:3.2 solution within 3 hours after priming before allowing to dry over 2 and 24 hours prior to topcoat application.

In FIG. 8, the composite coupons were primed, then left for 2 and 18 hours before the treatment solution was applied and left to dry for 2 hours. The topcoat was then applied to the coupons.

Example 11—Robustness of Top Coat after the Surface Treatment

The interfacial adhesion of the organometallic layer to the topcoat was assessed by various industrial testing method including rain erosion, pencil hardness and scribe after Skydrol hydraulic fuel, Pace B-82 cleaning agent, or water immersion. Samples preparation, priming and painting were carried out as described in Example 1 and robustness test was carried out as detailed in the "Characterisation and Testing" sections. Surface treatment was carried out with 3.5% PEAA-Zn (Primacor P5990I, Zn:A=1:3.2) and 7.5 wt % Proglyde DMM in 1:1 and results obtained were compared to standard untreated specimen and summarised in FIG. 9 (a&b) and in Tables 5, 6 and 7. It can be noted that the interfacial adhesion of sample surface treated by the PEAA-Zn formulations is very similar to the standard untreated one and pass the industrial standard. Surface treated rain erosion foils presented in FIG. 9 (a&b) demonstrate good top coat stripping within 4 hours by alkaline stripper, stripping tested after rain erosion test, while the Std untreated foils show no top coat stripping.

TABLE 5

Pencil hardness after Skydrol and water soak

| Sample Name | Pencil Hardness No Soak | Pencil Hardness 30 day Water | Pencil Hardness 30 day Skydrol |
|---|---|---|---|
| Std Untreated | 8H | 4H | 2H |
| 3.5% wt PEAA, 1:3.2 Zn:Acid 7.5% wt Proglyde DMM | 2H | HB | 4B |

TABLE 6

Scribe adhesion testing

| Sample | No Soak | Water Soak | Skydrol Soak |
|---|---|---|---|
| Std Untreated | 9 | 10 | 9 |
| 3.5% wt PEAA, 1:3.2 Zn:Acid 7.5% wt Proglyde DMM | 8 | 9 | 8 |

TABLE 7

Pace B-82 Immersion

| Sample | 24 hours | 21 days |
|---|---|---|
| Std Untreated | No Change | No change |
| 3.5% wt PEAA 1:3.2 Zn:Acid | No Change | No change |
| 3.5% wt PEAA 1:3.2 Zn:Acid 5% Proglyde | No Change | No change |

Example 12: Interface Chemistry-Stripping Mechanism

Specimen treated with 3.5% PEAA and 1:3.2 Zn:acid and top coated with urethane paint as of example 2 (i) was stripped with alkaline stripper CeeBee-E2012A. Application of the stripper results in the top coat lifting in sheet form from the rest of the coating system. When topcoat layer starts to lift from the substrate, excess stripper on the top coat was rinsed off using water and the topcoat layer was peeled off mechanically with help of a scotch tape. Care was taken to ensure that no cracking of the topcoat layer and such no stripper and water was introduced to the interface during the process to avoid surface contamination on surface area to be analysed following by XPS (excluding the diffusion of water and other components from stripper through the topcoat). Both side of the surface referred as "Topcoat Side" and "Substrate Side" generated from the disrupted organometallic layer were then analysed by XPS and surface chemical compositions obtained were presented in Table 8. Surfaces with most out layer comprise of primer, organometallic layer or topcoat referred as "Primer", "Topcoat" and "Organometallic Layer" were also analysed by XPS and surface chemical compositions obtained were included in Table 8 for comparison.

TABLE 8

Surface chemical composition of stripped interface and reference surfaces

| Surface | C % | O % | N % | Si % | S % | Zn % | Zn/C × 1000 |
|---|---|---|---|---|---|---|---|
| Primer | 81.46 | 9.8 | 7.13 | 0.34 | 0.56 | | |
| Topcoat | 81.78 | 16.03 | 1.54 | 0.12 | 0.53 | | |

TABLE 8-continued

Surface chemical composition of stripped interface and reference surfaces

| Surface | C % | O % | N % | Si % | S % | Zn % | Zn/C × 1000 |
|---|---|---|---|---|---|---|---|
| Topcoat Side | 88.03 | 9.03 | 2.56 | | | 0.37 | 4.2 |
| Substrate Side | 87.99 | 8.56 | 3.11 | | | 0.34 | 3.9 |
| Organometallic Layer | 90.22 | 8.31 | 0.07 | 0.92 | 0.24 | 0.49 | 5.4 |

It can be note that zinc element was not presented in the primer and topcoat surface, indicating it comes from the surface treatment solution. The surface chemical compositions are very similar for both surface "Topcoat Side" and "Substrate Side" generated from the interrupted interface and are very close to those of organometalic layer. These evidences prove that stripping of topcoat occurs at the organometalic layer when it is disrupted by the stripper.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. An organometallic layer which is formed from a treatment formulation comprising:
   (a) an organic polymer containing multi-chelating functionalities, wherein the multi-chelating functionalities are selected from carboxylic, anhydride precursors, or phosphonic acid groups;
   (b) a metallic agent which is selected from an oxide, hydroxide or salt of silver, copper, nickel, strontium, thallium, tin, titanium, vanadium, zinc, tungsten or zirconium and which forms an organo metallic complex with the organic polymer containing multi-chelating functionalities; and
   (c) a solvent,
   wherein the molar ratio (Z:A) of metallic agent (Z) to the chelating functionality (A) of the organic polymer containing multi-chelating functionalities is in the range of 1:1 (Z:A) to 1:10 (Z:A);
   the treatment formulation having a solid concentration in the range of 1% to 10% based on the total weight of the formulation; and
   the organometallic layer having a dry thickness in the range of 5 microns or less and being located between a coated substrate and at least one post coating layer of a coating system and capable of being disrupted with an alkaline stripping agent.

2. The organometallic layer according to claim 1 which further comprises an organic crosslinker.

3. The organometallic layer according to claim 1 in which the multi-chelating functionalities are multi-carboxylate functionalities.

4. The organometallic layer according to claim 1 in which the organic polymer containing multi-chelating functionalities is a copolymer or oligomer of ethylene or styrene with acrylic, (meth)acrylic or maleic anhydride.

5. The organometallic layer according to claim 2 in which the organic crosslinker is carbodimide.

6. The organometallic layer according to claim 1 in which the optionally coated substrate is a metal, polymer, composite or elastomer.

7. The organometallic layer according to claim 1 in which the post coating layer is a fully or partially cross-linked organic coating.

8. A coating system which comprises:
   (i) an optionally coated substrate;
   (ii) at least one post coating layer; and
   the organometallic layer according to claim 1 located between (i) and (ii).

9. A process for coating a coated substrate with at least one post coating layer which comprises
   (i) applying a treatment formulation which comprises (a) an organic polymer containing multi-chelating functionalities, wherein the multi-chelating functionalities are selected from carboxylic, anhydride precursors or phosphonic acid groups; (b) a metallic agent which is selected from an oxide, hydroxide or salt of silver, copper, nickel, strontium, thallium, tin, titanium, vanadium, zinc, tungsten or zirconium and which forms an organo metallic complex with the organic polymer containing multi-chelating functionalities; and (c) a solvent to form the organometallic layer according to claim 1 to the coated substrate, wherein the molar ratio (Z:A) of metallic agent (Z) to the chelating functionality (A) of the organic polymer containing multi-chelating functionalities is in the range of 1:1 (Z:A) to 1:10 (Z:A); and
   (ii) applying at least one post coating layer to the organometallic layer.

10. A treatment formulation to be applied to a coated substrate for selectively stripping a post-coating layer applied on the treatment formulation which comprises:
    (a) an organic polymer containing multi-chelating functionalities, wherein the multi-chelating functionalities selected from carboxylic, anhydride precursors, or phosphonic acid groups;
    (b) a metallic agent which is selected from an oxide, hydroxide or salt of silver, copper, nickel, strontium, thallium, tin, titanium, vanadium, zinc, tungsten or zirconium and which forms an organo metallic complex with the organic polymer containing multi-chelating functionalities; and
    (c) a solvent,
    wherein the molar ratio (Z:A) of metallic agent (Z) to the chelating functionality (A) of the organic polymer containing multi-chelating functionalities is in the range of 1:1 (Z:A) to 1:10
    the treatment formulation having a solid concentration in the range of 1% to 10% based on the total weight of the formulation; and
    the treatment formulation being used to form an organometallic layer having a dry thickness in the range of 5 microns or less and being locating between the coated substrate and the post-coating layer of a coating system and capable of being disrupted with an alkaline stripping agent.

11. The treatment formulation according to claim 10 in which the solvent is water, a polar organic solvent or mixtures thereof.

12. The treatment formulation according to claim 10 which further comprises a crosslinker and/or an additive.

13. A process for selectively removing the at least one post coating layer from the coating system according to claim 8 which comprises
   (i) treating the at least one post coating layer with an alkaline stripping agent capable of disrupting the organometallic layer; and
   (ii) removing the at least one post coating layer from the coating system.

14. A process for coating an optionally coated substrate with at least one post coating layer which comprises
   (i) treating the at least one post coating layer of the coating system according to claim 8 with an alkaline stripping agent capable of disrupting the organometallic layer to remove at least one coating layer from the coating system;
   (ii) forming a further organometallic layer according to claim 1; and
   (iii) applying at least one further post coating layer to the organometallic layer.

15. A process for coating an optionally coated substrate with at least one post coating layer which comprises
   (i) treating the at least one post coating layer of the coating system according to claim 8 with an alkaline stripping agent capable of disrupting the organometallic layer to remove at least one post coating layer from the coating system;
   (ii) applying at least one further post coating layer;
   (iii) treating the at least one further post coating layer with an alkaline stripping agent capable of disrupting the organometallic layer to remove at least one further post coating layer;
   (iv) removing the at least one further post coating layer;
   (v) optionally repeating steps (ii) to (iv);
   (vi) forming a further organometallic layer according to claim 1; and
   (vii) applying at least one even further post coating layer to the further organometallic layer.

16. The organometallic layer according to claim 1 in which the molar ratio (Z:A) of metallic agent (Z) to the chelating functionality (A) of the organic polymer containing multi-chelating functionalities is in the range of 1:2 (Z:A) to 1:5 (Z:A).

17. The process according to claim 9 in which the molar ratio (Z:A) of metallic agent (Z) to the chelating functionality (A) of the organic polymer containing multi-chelating functionalities is in the range of 1:2 (Z:A) to 1:5 (Z:A).

18. The treatment formulation according to claim 10 in which the molar ratio (Z:A) of metallic agent (Z) to the chelating functionality (A) of the organic polymer containing multi-chelating functionalities is in the range of 1:2 (Z:A) to 1:5 (Z:A).

19. The organometallic layer according to claim 1, wherein the solvent is benzyl alcohol.

* * * * *